Aug. 31, 1943.     S. N. BARUCH ET AL     2,328,320
REMOTE CONTROL AND INDICATOR
Filed Sept. 17, 1942     2 Sheets-Sheet 1

INVENTORS
Sydney N. Baruch
Joseph Weinberg
Darby & Darby
ATTORNEYS

Aug. 31, 1943.                S. N. BARUCH ET AL                2,328,320
                         REMOTE CONTROL AND INDICATOR
                         Filed Sept. 17, 1942           2 Sheets-Sheet 2
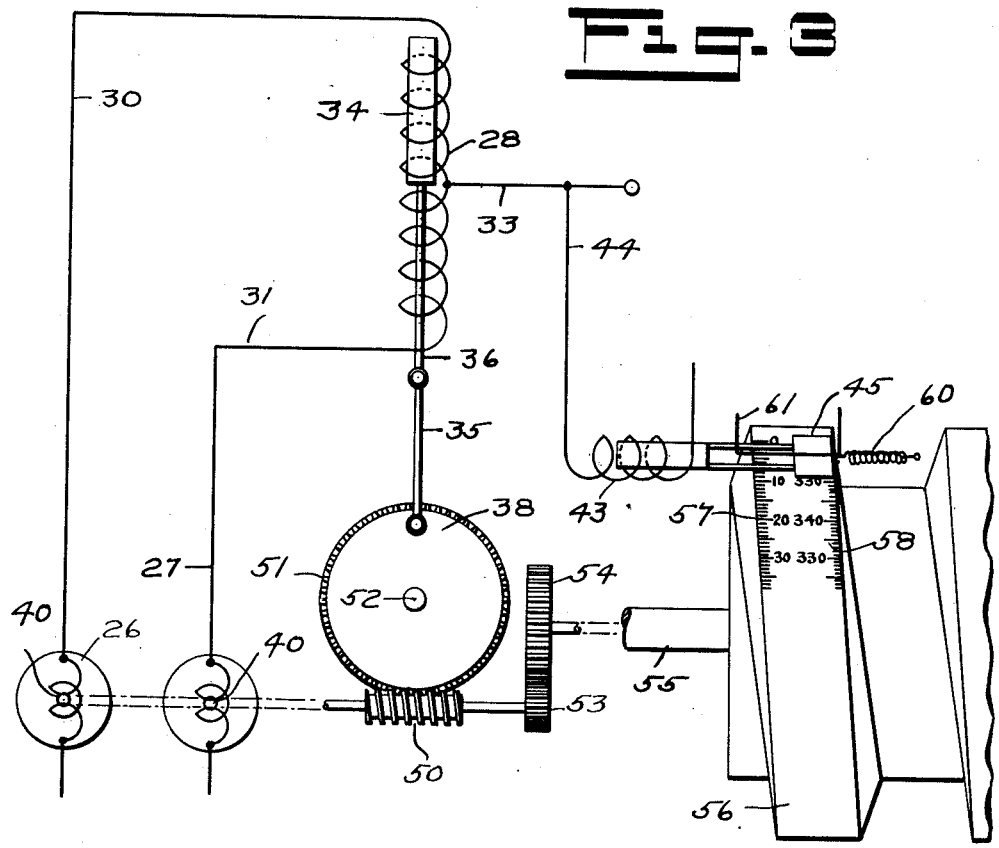
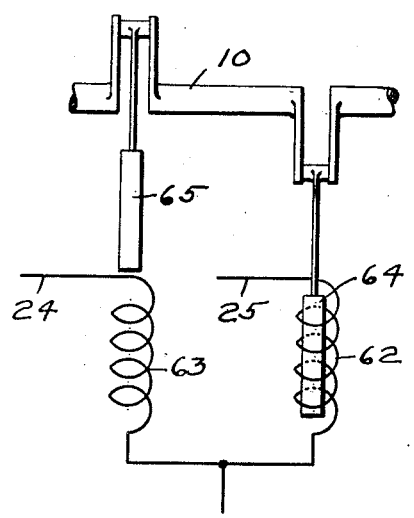
INVENTORS
Sydney N. Baruch
Joseph Weinberg
Darby & Darby
ATTORNEYS Patented Aug. 31, 1943

2,328,320

UNITED STATES PATENT OFFICE 2,328,320

REMOTE CONTROL AND INDICATOR

Sydney N. Baruch, New York, and Joseph Weinberg, Rego Park, N. Y., assignors to General Arc Lighting Company, Inc., Corona, Long Island, N. Y., a corporation of New York Application September 17, 1942, Serial No. 458,747

9 Claims. (Cl. 172—239)

The present invention relates to means for controlling the movement of an object at a distance from the control point and particularly to means for controlling the movement of a rotatable object. The same means may be used to give an indication at a distance of the movement of a rotating or rotatable object.

In the past, means have been used, as for example the common "Selsyn" motors, to give a means of remote control and indication. Such means, however, were expensive and further were only usable when permanently connected to the object to be controlled, or to the object the movement of which was to be indicated. There are, however, many instances in which it is desirable that an indicating means or a remote control means be used periodically with the connection thereto broken in the intervening time and when there has been movement of the control means during the period when the connection was broken. The device of the present invention is capable of causing a rotatable object to be positioned at a definite point, even though setting of the control is made prior to the establishment of the connection to the controlled object. In like manner it is frequently necessary to have an indication of the position of a rotatable object immediately upon the establishing of connection between the object and the remote indicating point.

It is an object of our invention to provide a simple, inexpensive, accurate control means for controlling the position of an object, particularly a rotatable object, from a distant point.

It is another object of our invention to give an indication of the position of a rotatable object at a distant point.

It is a further object of our invention to provide such a control or indicating means in which the control is exercised or the indication given immediately upon establishing a connection between the control or indicating point and the point at which the movable object is located.

It is a further object of our invention to provide such a control or indicating means in which the control is exercised or the indication given immediately upon establishing a connection between the control or indicating point and the point at which the movable object is located even though the last movement of the control means or of the movable object as the case may be, occurred during the period when the connection was broken.

It is a still further object of our invention to provide such an indicating or controlling means in which the indicating or control element, depending of course upon the use of the invention, is locked in its operated position thereby greatly increasing the reliability and accuracy of the device.

Other objects and features of the invention will appear when the following specification is considered in connection with the annexed drawings, in which Figure 1 is a schematic circuit diagram showing the preferred embodiment of our invention;

Figure 3 is a fragmentary circuit diagram showing a modification of the control arrangement of Figure 1; and Figure 4 is a fragmentary schematic diagram showing another modification of the mechanical arrangement used in connection with the circuit of Figure 1.

Figure 1:
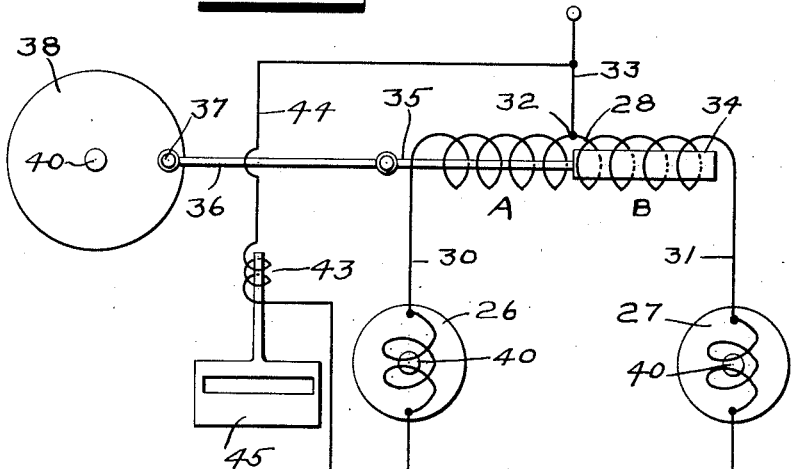

Referring now to the drawings, there is shown in Figure 1 a shaft 10 on which is mounted the object the position of which is to be indicated, as for example a searchlight base (not shown). Likewise mounted on this shaft 10 is a crank disc 11 carrying the crank pin 12. Pivotally mounted on the crank pin 12 in the usual manner, is a connecting rod 13 which is in turn connected to a link 14. Fastened to the link 14 is a magnetic core 15 of a two part solenoid 16. Likewise fixed to the shaft 10 is a commutator disc 17 having an insulating segment 18. This commutator disc cooperates with brushes 20 and 21 for a purpose which will be hereinafter described.

The center tap 22 of solenoid 16 is connected to one side of a source of alternating current power by means of the conductor 23. The ends of the solenoid winding are connected by conductors 24 and 25 to the motors 26 and 27, which motors are located at a point remote from the equipment heretofore described. These motors, which are preferably of the hysteresis type, though they may be alternating current motors of other types, are then connected to the ends of the winding of a solenoid 28 which is similar to the solenoid 16, these connections being made by means of the conductors 30 and 31.

The winding of solenoid 28 is likewise center tapped, as indicated at 32, and connected at this center tap by means of conductor 33 to the other line of the alternating current power source. The solenoid 28 is provided with a movable core 34 similar to the core 15 of solenoid 16, this movable core being connected by link 35 and connecting rod 36 to a crank pin 37 mounted on a crank disc 38, which disc is in turn fixed to shaft 40 on which the rotors of the hysteresis motors 26 and 27 are likewise mounted. The disc 38 may be formed with a flange thereon on which a scale is impressed in order that the position of the shaft 40 may be read.

Extending from the conductor 23 to the brush 20 there is a lead 41. Likewise a conductor 42 extends from brush 21 to the remote point and at that remote point is connected to the winding of a solenoid 43. Another conductor 44 extends this circuit from the other end of the winding of solenoid 43 to conductor 33 and through it of course to the other terminal of the alternating current power source.

Assume now that power has been supplied over conductors 23 and 33 to the system hereinabove described. Thus, when the parts are positioned as shown in Figure 1, the current flowing through hysteresis motor 26 will balance that flowing through hysteresis motor 27. The portion A of solenoid 16 which has the core 15 within it, limits the current while the portion A of solenoid 28, which at the moment has no magnetic core therein, does not appreciably limit the current. In the same way the right hand portion B of the winding of solenoid 16 does not appreciably limit the flow of current to hysteresis motor 27, while the portion B of solenoid 28, having the core 34 within it, does appreciably limit the current. Thus the two circuits are balanced and as stated before the current flowing through motors 26 and 27 will be equal. Inasmuch as these motors are connected for operation in opposite directions, the shaft 40 remains in position. Obviously, the major consideration is that the two motors exert equal torque when operated to a particular position. This, of course, may be achieved by having the motors of substantially identical characteristic and having the solenoids 16 and 28 likewise of substantially identical characteristics, as has been described, or may be achieved by utilizing motors and solenoids of different characteristics together with auxiliary resistances etc., to bring about the condition of equal torque.

Figure 2:
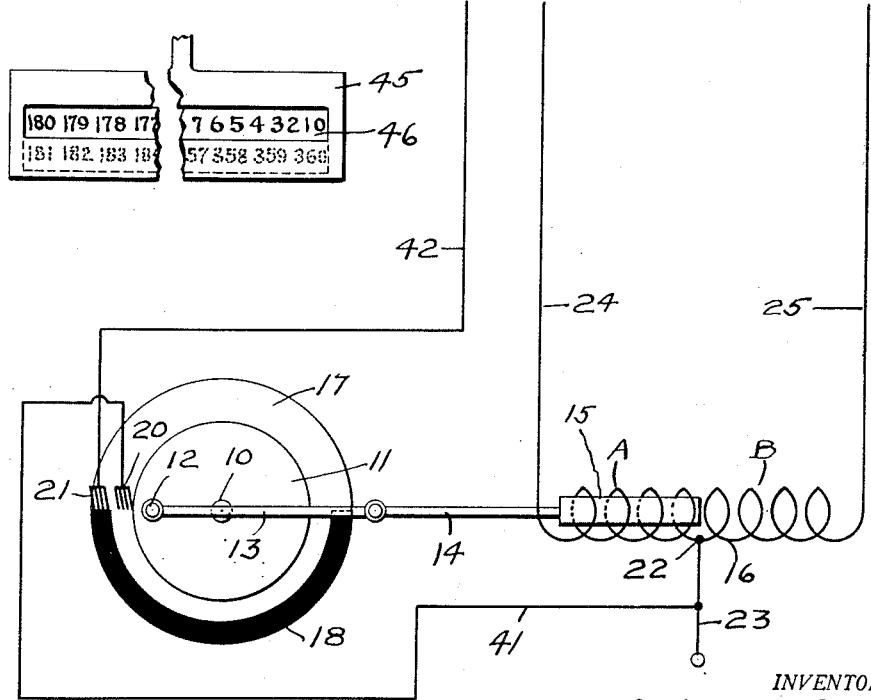
Figure 2 is a detail of the shutter arrangement of Figure 1.

There will also be a flow of current from the power source over conductors 23 and 41 and through brush 20, conducting portion of disc 17 and brush 21 to conductor 42, thence over that conductor to the remote point and through the winding of solenoid 43 and conductors 44 and 33 to the opposite terminal of the power source. This will energize the solenoid 43 and cause the shutter 45 to be in its upper position, thereby exposing the upper portion of the scale 46 (see Figure 2) to view and indicating at this moment that the movable object is at the 180° position.

Assume now that the rotatable object attached to shaft 10 is operated clockwise, as seen in Figure 1, to a slight extent. This movement will be effective through connecting rod 13 and link 14 to move the core 15 further into the winding of solenoid 16. This will result in increasing the flow of current through the circuit, which includes the portion A of the winding, and decreasing the current through the circuit including the portion B of the winding of solenoid 16. It may be mentioned here that the winding of solenoid 16 acts somewhat as an auto-transformer, and that therefore the amount of current decrease in portion B and current increase in portion A of the solenoid winding is somewhat less than would be the case were this auto-transformer action to be neglected. Nevertheless the increase and decrease mentioned unbalance the circuit and cause a greater flow through the winding of hysteresis motor 26 than through motor 27.

As a result of this unbalance, shaft 40 will be rotated in a clockwise direction until the movement of core 34 of solenoid 28 into the portion A of that solenoid is equal to the original movement of solenoid core 15 into the portion B of coil 16. At this time the balance of current through the two hysteresis motors 26 and 27 will be reestablished and the indicator will come to rest indicating the new position of the movable object attached to shaft 10. Furthermore during the operation described above, brush 21 will leave the conducting portion of disc 17 and will therefore break the circuit over conductor 42 to the solenoid 43. As a result thereof, the shutter 45 will move to its lower position exposing the lower half of the scale 46 and showing the position of the remote object correctly.

The necessity for the shutter 45 is of course due to the fact that whereas the movable objects may be rotated always in the same direction, shaft 40 merely oscillates through 180° and thus to determine the correct position of the object it is necessary to show the direction of movement as well as the amount of movement of the shaft 40. This is of course accomplished by the shutter and solenoid arrangement previously described.

It will be clear that the arrangement just described as an indicator may likewise be utilized for controlling the position of an object at a remote point. The object to be controlled may be mounted on the shaft 40 and the shaft 10 be provided with a handle or a motor drive to position it in any desired position. In this event the amount of movement will be limited to 180° and it will of course be unnecessary to provide the shutter 45 and its solenoid and connections.

In some instances it is desirable that the scale be "spread out" so that it may be more easily read. Figure 3 shows one manner in which this may be accomplished. Here the shaft 40 of the hysteresis motors 26 and 27 is provided with a worm 50 which drives a worm gear 51 which is, in turn, coupled to a shaft 52 on which the crank disc 38 is mounted. This crank disc then controls the movement of the core 34 of solenoid 28 by means of the link 35 and connecting rod 36, as has been above described. Due to this arrangement the core of solenoid 28 moves more slowly than the core of solenoid 16 and consequently when the balance in the circuit has been upset it takes a longer period for that balance to be reestablished.

Referring still to Figure 3, there is attached to shaft 40 a gear 53 which meshes with a gear 54 mounted on a shaft 55, which shaft carries a spiral 56 on which the scale is fixed. As before, the scale is made in two portions, one portion designated 57 lying at the left hand side of the spiral surface, as seen in Figure 3, runs from 0° to 180°, and the other portion 58, lying to the right of the spiral, runs from 360° to 180°.

Likewise the shutter 45 is again provided, in this instance being moved to its right hand position by means of a spring 60 and being moved to its left hand position by means of the solenoid 43 which is connected in the circuit in the same manner as was described in connection with Figure 1. The entire shutter mechanism, including the spring 60, shutter 45 and solenoid 43, is slidably mounted in a manner not shown and is capable of moving horizontally as the spiral is rotated under control of the guide member such as shown at 61 in Figure 3.

In some instances it is desirable to eliminate the auto-transformer effect which has been mentioned above. This may be accomplished by an arrangement such as that shown in Figure 4 in which two solenoids 62 and 63 are substituted for the single solenoid 16 or 28, these two solenoids being electrically connected together as shown in Figure 4 and having conductors extending from the opposite ends of their windings in the same manner as conductors 24 and 25 extend from those of solenoid 16.

In place of the single core member 15 supplied for solenoid 16 there are two core members 64 and 65, one of which cooperates with solenoid 62 and the other with solenoid 63. These solenoids are connected to throws of a crank shaft 10 which replaces the crank disc 11 of Figure 1. It will be seen that with this arrangement as one core is moved further into the winding of the solenoid the other core moves out of the winding of its solenoid. In other words, as the current flow through one solenoid winding is increased, that through the other winding is decreased. However with this arrangement there is no magnetic connection and consequently the auto-transformer effect is eliminated.

It will be clear that the arrangement of Figure 4 may be utilized with that of Figure 1 or with that of Figure 3, and likewise that many other modifications of our invention other than those discussed above may be made. Therefore we wish to be limited not by the foregoing description, which was given for the purpose of illustration, but solely by the appended claims.

What is claimed is:

1. In a device for determining the position of a movable object, in combination, a solenoid having a movable magnetic core, means mechanically connecting said core to said movable object, a position determining means located at a point remote from said movable object, a second solenoid having a movable magnetic core, said core being connected to said position determining means for movement therewith, connections joining the windings of said solenoids to form two normally balanced parallel circuits and motor means included in said circuits for operating one of said solenoids to a position corresponding to the position of the other thereof whereby the movable object and the position determining means are caused always to occupy corresponding positions.

2. In a device for determining the position of a movable object, in combination, a solenoid having a movable magnetic core, said solenoid having a center tapped coil, means mechanically connecting said core to said movable object, a position determining means located at a point remote from said movable object, a second solenoid having a movable magnetic core, said second solenoid having a center tapped coil and having the core thereof connected to said position determining means for movement therewith, a power source connected across the center taps of said solenoid coils, connections joining the other terminals of said coils, motor means in the parallel circuits thus formed, said motor means being operable upon the movable core of one of said solenoids, the said motor circuits being normally balanced, operation of said motor means serving to re-establish said balance when it is disturbed by operation of one of said solenoids whereby the movable object and the position determining means occupy similar positions.

3. In a remote control means, in combination, a control member comprising a settable member and a solenoid having a movable core operable by said settable member, a controlled member located at a remote point from said control member, said controlled member comprising a pair of motors tending to drive a common shaft and a solenoid having a movable core, said core being driven by said common shaft, circuits interconnecting the windings of said solenoids at the control and the controlled points and a supply source connected to said solenoids to form two parallel circuits each including a portion of the winding of each solenoid and one of said motors, said cores being so positioned in said solenoids as to tend to maintain the balance of said two circuits, whereby when said control member is operated the circuit balance is upset and one of said motors is caused to operate the common shaft in a direction to move the core of the other solenoid to a position to re-establish a circuit balance.

4. In a device for indicating the position of a movable object at a remote point, in combination, a solenoid having a movable core connected to be positioned in accordance with the position of the movable object, a pair of parallel circuits extending from two portions of the winding of said solenoid to the remote indicating point, an indicator at said remote point and having connected thereto a second solenoid at said remote point, said second solenoid being connected to said indicator for movement therewith, the windings of said second solenoid being connected in the circuits from the windings of the first mentioned solenoid windings, a motor in each of said two parallel circuits, said motors being mounted on a common shaft for operation in opposite directions, said shaft driving said indicating means and said movable core of said second solenoid, and means to operate said movable object to desired positions whereby the movable core of said first mentioned solenoid is re-positioned within the winding thereof to upset the balance of the two circuits to thereby cause an increase in the torque exerted by one of said two motors which thereupon drives the movable core of the second mentioned solenoid to a position at which the balance is restored, this position corresponding to the position of the movable object and being indicated upon the said indicator.

5. In a device for indicating the position of a movable object at a remote point, in combination, a solenoid having a movable core connected to be positioned in accordance with the position of the movable object, a pair of parallel circuits extending from two portions of the winding of said solenoid to the remote indicating point, an indicator at said remote point, said indicator comprising a split scale having values from zero to a median reading on one portion thereof and from the median reading to a maximum on the other portion thereof and a shutter operable to expose either portion of the said scale and having connected thereto a second solenoid at said remote point, said second solenoid being connected to said indicator for movement therewith, the windings of said solenoid being connected in the circuits from the first mentioned solenoid windings, a motor in each of said two parallel circuits, said motors being mounted on a common shaft for operation in opposite directions, said shaft driving said indicating means and said movable core of said second solenoid, means to operate said movable object to desired positions whereby the movable core of said first mentioned solenoid is re-positioned within the winding thereof to upset the balance of the two circuits to thereby cause an increase in the torque exerted by one of said two motors which thereupon drives the movable core of the second mentioned solenoid to a position at which the balance is restored, this position corresponding to the position of the movable object and being indicated upon the said indicator, a commutator connected to said movable object for operation therewith, a circuit extending through said commutator to the remote point, a solenoid at said remote point in said circuit, said solenoid controlling the operation of said movable shutter whereby the correct indication of the position of the movable object is given at said remote point irrespective of the direction of operation of said movable object.

6. A device as claimed in claim 4 wherein the movable core of said second solenoid is connected to said motor shaft through a worm and worm wheel.

7. A device as claimed in claim 4 in which the said indicator scale is in spiral formation and the said indicator is driven from the common motor shaft through gears thereby spreading out the indicator scale to make it more readily and accurately readable.

8. A device as claimed in claim 1 wherein the movable magnetic cores of the two solenoids are at all times 180° out of phase as respects their positions in their windings and wherein each of the two balanced circuits includes, when the movable object is in a zero position, a portion of one solenoid having at that moment no magnetic core and a portion of another solenoid having at the moment a complete magnetic core.

9. In a device for determining the position of a movable object, in combination a pair of solenoids having one common terminal, each solenoid having a movable core, means connecting said cores to the movable object with 180° phase displacement, a position determining means located at a point remote from said movable object, a second pair of solenoids having one common terminal, each solenoid having a movable core, means connecting said cores to the movable object with 180° phase displacement, said cores being arranged so that one is completely within the solenoid when the other is completely out of its solenoid, connections joining the windings of said solenoids to form two normally balanced parallel circuits and motor means included in said circuits for operating one pair of solenoid cores to positions corresponding to positions of the other pair of solenoid cores whereby the movable object and the position determining means are caused always to occupy corresponding positions.

SYDNEY N. BARUCH.
JOSEPH WEINBERG.